（12）United States Patent
Kostiainen

(10) Patent No.: US 7,103,390 B2
(45) Date of Patent: Sep. 5, 2006

(54) METHOD AND SYSTEM FOR TRANSFERRING DATA IN A HAND-HELD ELECTRONIC DEVICE

(75) Inventor: Pekka Kostiainen, Helsinki (FI)

(73) Assignee: Nokia Corporation, Espoo (FI)

( * ) Notice: Subject to any disclaimer, the term of this patent is extended or adjusted under 35 U.S.C. 154(b) by 674 days.

(21) Appl. No.: 09/994,472

(22) Filed: Nov. 26, 2001

(65) Prior Publication Data

US 2003/0100346 A1    May 29, 2003

(51) Int. Cl.
*H04M 1/00* (2006.01)
(52) U.S. Cl. ............... 455/567; 455/550.1; 455/575.1; 455/556.1; 379/373.01; 379/374.01; 379/374.03; 379/376.01
(58) Field of Classification Search ............... 455/567, 455/41.2, 67.11, 550.1, 575.1, 90.3, 418, 455/419, 466, 556.1; 379/373.01, 374.01, 379/374.03, 376.01
See application file for complete search history.

(56) References Cited

U.S. PATENT DOCUMENTS

| | | | |
|---|---|---|---|
| 6,094,587 A * | 7/2000 | Armanto et al. ............ 455/567 |
| 6,263,218 B1 * | 7/2001 | Kita ............................ 455/567 |
| 2001/0012761 A1 * | 8/2001 | Mitama et al. ............... 455/41 |
| 2001/0014616 A1 * | 8/2001 | Matsuda et al. ............ 455/567 |
| 2002/0115456 A1 * | 8/2002 | Narinen et al. ............. 455/466 |
| 2003/0083110 A1 * | 5/2003 | Lutche et al. ............... 455/567 |
| 2005/0181838 A1 * | 8/2005 | Matsuda et al. ............ 455/567 |

* cited by examiner

*Primary Examiner*—George Eng
*Assistant Examiner*—Huy Phan
(74) *Attorney, Agent, or Firm*—Ware, Fressola, Van Der Sluys & Adolphson LLP

(57) ABSTRACT

A method and system for transferring data between a phone body and a phone cover having a functionality. The data can be divided into a sequence of bit patterns which can be assigned to different frequency ranges. By arranging the frequencies in a ringing tone according to the sequence of bit patterns, the data is embedded in the ringing tone. The phone cover has a device to receive the ringing tone signal. Based on the sequence of frequencies in the ringing tone signal, the phone cover can retrieve the sequence of bit patterns for effecting the functionality of the phone cover.

16 Claims, 2 Drawing Sheets

METHOD AND SYSTEM FOR TRANSFERRING DATA IN A HAND-HELD ELECTRONIC DEVICE

FIELD OF THE INVENTION

The present invention relates generally to a method and system for transferring data in a hand-held electronic device, such as a mobile phone, and, more particularly, to the data transfer between a phone body and a phone cover, or other attachments and accessories.

BACKGROUND OF THE INVENTION

Personalization is one of the most attractive features in the sale of mobile phones, especially in the low-price market sector. Currently, the possibilities in "personalizing" a mobile phone are related to changing the color and/or design of the phone cover. To change the color or design of the phone cover, the user usually replaces one cover with another. Thus, the possibilities are somewhat limited.

It is advantageous and desirable to provide a method and system for the personalization of a phone set, wherein the phone cover has a means for effecting a change in the appearance or a functionality in the phone cover, upon receiving signals conveyed to the phone cover from the phone body.

SUMMARY OF THE INVENTION

A hand-held electronic device, such as a mobile phone, has a device body and a device accessory. It is desirable that the device accessory has a functionality, which can be effected upon receiving data from the device body. For example, the device cover can have a vibrator, which can vibrate in a manner as indicated by the data. Alternatively, the device accessory can have a plurality of light-emitting diodes (LEDs), which can be caused to flash in a manner similar to the old-fashioned "light organ", reacting to the data received by the device accessory. Furthermore, the functionality can be changed by conveying a programming data from the device body to the device accessory. As a result, the device accessory has a different functionality than before. For example, the LEDs, reacting to the same ringing tone, flash in a different sequence from the sequence before the functionality is changed.

Thus, it is a primary object of the present invention to provide a method and system for transferring data from the device body to the device accessory. The object can be achieved by embedding the data in a ringing tone.

Accordingly, the first aspect of the present invention is a method of transferring data in a device, wherein the data comprises a sequence of data segments. The method comprises the steps of:

conveying a ringing tone from a device body to a device accessory having a functionality, wherein the ringing tone comprises a sequence of frequencies indicative of the sequence of data segments, receiving the ringing tone by the device accessory, retrieving the sequence of data segments from the received ringing tone based on the sequence of frequencies in the received ringing tone, and using the retrieved sequence of data segments for effecting the functionality.

According to the present invention, the method further comprises the steps of relating a different frequency or frequency range to each data segment and arranging the related frequencies according to the sequence of the data segments for providing at least one part of the ringing tone, prior to the conveying step.

According to the present invention, the functionality can be changed by a programming data having a further sequence of data segments and the sequence of frequencies is further indicative of the further sequence of data segments.

Accordingly, the second aspect of the present invention is a system for transferring data in a device having a device body and a device accessory, wherein the device body is capable of providing a ringing tone comprising a sequence of frequencies, and the device accessory has an effecting mechanism to effect a functionality of the device accessory, and wherein the data comprises a sequence of data segments. The system comprises:

a first mechanism, disposed in the device accessory, for receiving the sequence of frequencies indicative of the sequence of data segments; and a second mechanism, disposed in the device accessory, adapted to retrieve the sequence of data segments from the received sequence of frequencies in the ringing tone, for allowing the effecting mechanism to effect the functionality of the device accessory based on the retrieved sequence of data segments.

According to the present invention, the functionality of the device accessory can be changed by a programming data having a further sequence of data segments and the sequence of frequencies in the ringing tone is further indicative of the further sequence of data segments. Furthermore, the second mechanism is capable of changing the functionality of the device accessory upon receiving the further sequence of data segments.

Accordingly, the third aspect of the present invention is a mobile terminal having a phone body and a phone accessory, wherein the phone body is capable of receiving a signal from an external device and providing a ringing tone having a sequence of frequencies in response to the signal, and wherein the phone accessory has a functionality, which can be effected by a data having a sequence of data segments provided by the phone body. The mobile terminal comprises:

a first device, disposed in the phone body, for conveying the ringing tone to the phone accessory, wherein the sequence of frequencies is indicative of the sequence of data segments; and a second device, disposed in the phone accessory, for receiving the ringing tone and retrieving the data sequence from the received ringing tone based on the sequence of frequencies in the received ringing tone so as to allow the phone accessory to effect the functionality based on the retrieved data segments.

According to the present invention, the functionality of the phone accessory can be changed by a programming data having a further sequence of data segments and the sequence of frequencies is further indicative of the further sequence of data segments. Furthermore, the second device is capable of changing the functionality of the phone accessory upon receiving the further sequence of data segments.

According to the present invention, the signal received by the mobile terminal from an external device can be a call signal or a short-messaging service (SMS) or multi-media messaging service (MMS) signal. The signal can be indicative of the programming data sent to the mobile terminal using a WEB (Internet) or PC application, for example, via an infrared link or a radio-frequency link.

The present invention will become apparent upon reading the description taken in conjunction with FIGS. 1 and 2.

BEST MODE TO CARRY OUT THE INVENTION

Figure 1:
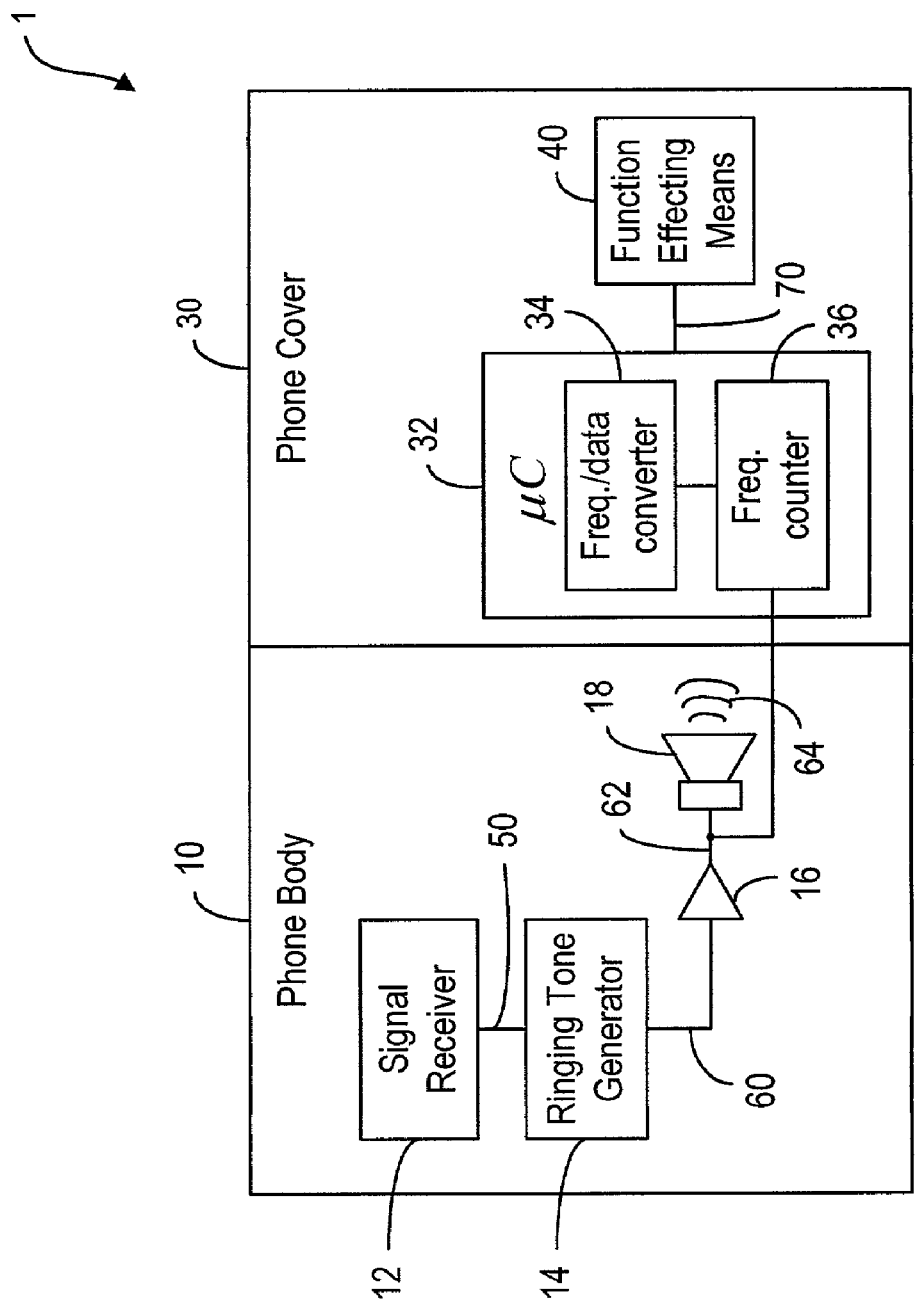
FIG. 1 is a block diagram illustrating a mobile phone having a system for transferring data from the phone body to the phone cover, according to the present invention

As shown in FIG. 1, a hand-held electronic device, such as a mobile phone 1, has a phone body 10, operatively connected to a phone cover 30. The phone body 10 has a communications device 12 for receiving a signal 50 from an external device (not shown). The phone body 10 also has a ringing tone generator 14, responsive to the signal 50, for providing a further signal 60 indicative of a ringing tone. The ringing tone signal 60 is a sequence of frequencies fed to a driver 16, which provides a driving signal 62 so as to allow a transducer or buzzer 18 to produce a sequence of audible notes 64. As shown in FIG. 1, a micro-controller 32 is disposed in the phone cover 30 and operatively connected to the driver 16 (or connected to the ringing tone generator 14), to receive the driving signals 62. The micro-controller 32, having a frequency counter 36, is capable of measuring the frequency in each frequency in the ringing tone signal 60 or the driving signal 62. According to the present invention, data is embedded in the ringing tone signal 60 so as to allow the phone body 10 to transfer the data from the phone body 10 to the phone cover 30. The data to be transferred can be represented by a sequence of data segments and each data segment can have a bit pattern related to a note or tone. For example, the bit pattern 0100 can be related to a note or tone having a frequency range from 332 Hz to 368 Hz, as shown in TABLE I. Accordingly, when the micro-controller 32 receives the driving signal 62 or the ringing tone 60 having a data embedded therein, the micro-controller 32 can retrieve the data segments based on the bit patterns represented by the frequency in the ringing tone signal 60. For example, the micro-controller controller 32 can have a converter 34 for identifying the data segments from the frequencies in the ringing tone signal 60. As shown in FIG. 1, the phone cover 10 also has a device 40, operatively connected to the micro-controller 32 to receive therefrom a signal 70, used to effect a functionality of the phone cover 30.

When the data transfer protocol is defined, ringing tones can be regarded as a low bandwidth data signal. The transferred data can be used to control the functionality of the phone cover 30. For example, if the functionality of the phone cover 30 is a certain sequence of flashing LEDs, then the device 40 has a plurality of LEDs, which can be caused to flash based on the data segments in the transferred data in response to the signal 70. As such, the LEDs are flashed in a certain sequence in response to the ringing tone 60.

It should be noted that the data link between the phone body 10 and the phone cover 30, as shown in FIG. 1, is a wired connection for allowing the phone cover 30 to receive the driving signal 62 or the ringing tone signal 60. However, the link can be wireless. For example, the ringing tone 60 can be conveyed to the phone cover 30 by infrared signals. Alternatively, the phone cover 30 can have a transducer (not shown), which can convert the audible notes 64 to a series of frequencies and provide the frequencies to the micro-controller 32.

The functionality of the phone cover 30 can be changed by transferring a programming data from the phone body 10 to the phone cover 30 using the same link. For example, a special ringing tone SMS or MMS-message can be created and sent to the communications device 12 in phone body 10 to effect the change of the phone cover functionality. Preferably, a certain bit pattern is embedded in the beginning portion of the ringing tone so as to allow the micro-controller 32 to recognize that the ringing tone is a programming data. Upon receiving the programming data, the micro-controller 32 goes into a programming mode to program itself. As a result, the phone cover 30 has a different functionality from that before programming. For example, the sequence of flashing LEDs is different from the previous sequence.

TABLE I

| Received Frequency (Hz) | Bit Pattern |
|---|---|
| 263–291 | 0000 |
| 295–327 | 0001 |
| 332–368 | 0010 |
| 372–413 | 0011 |
| 394–437 | 0100 |
| 442–490 | 0101 |
| 497–550 | 0110 |
| 558–618 | 0111 |
| 626–693 | 1000 |
| 703–778 | 1001 |
| 789–874 | 1010 |
| 885–980 | 1011 |
| 994–1100 | 1100 |
| 1185–1235 | 1101 |
| 1253–1385 | 1110 |
| 1407–1555 | 1111 |
| 1578–1746 | REPEAT |

As a certain range of frequencies is assigned to a bit pattern, it is not necessary to define a time limit within which a bit pattern is conveyed to the cover. The duration of a frequency in the sequence of frequencies indicative of the ringing tone can be long or short. Accordingly, in order to send data having repeating bit patterns, a frequency range is assigned as a REPEAT signal to indicate such repetition. For example, to send a data segment having a bit pattern 110111011101, the corresponding frequencies in the ringing tone signal 60 can be 1210, 1661, 1210 Hz. If no REPEAT signal occurs, a very long note is still considered as one note containing one bit pattern. A change in the bit pattern in the retrieved data occurs only when a change in the frequency range in the ringing tone signal is received by the phone cover 30. However, sufficient time should be allowed for the micro-controller 32 to recognize and verify different frequencies. For example, 15 ms per note in a ringing tone can be used for sending data from the phone body 10 to the phone cover 30. If 30 bytes of data are required to be conveyed to the phone cover 30 in order for the phone cover 30 to effect its functionality, then the total time for sending such data is 0.9 seconds. When these data notes are incorporated into the beginning portion of a regular ringing tone, the phone user can hardly notice the existence of the data notes.

Figure 2:
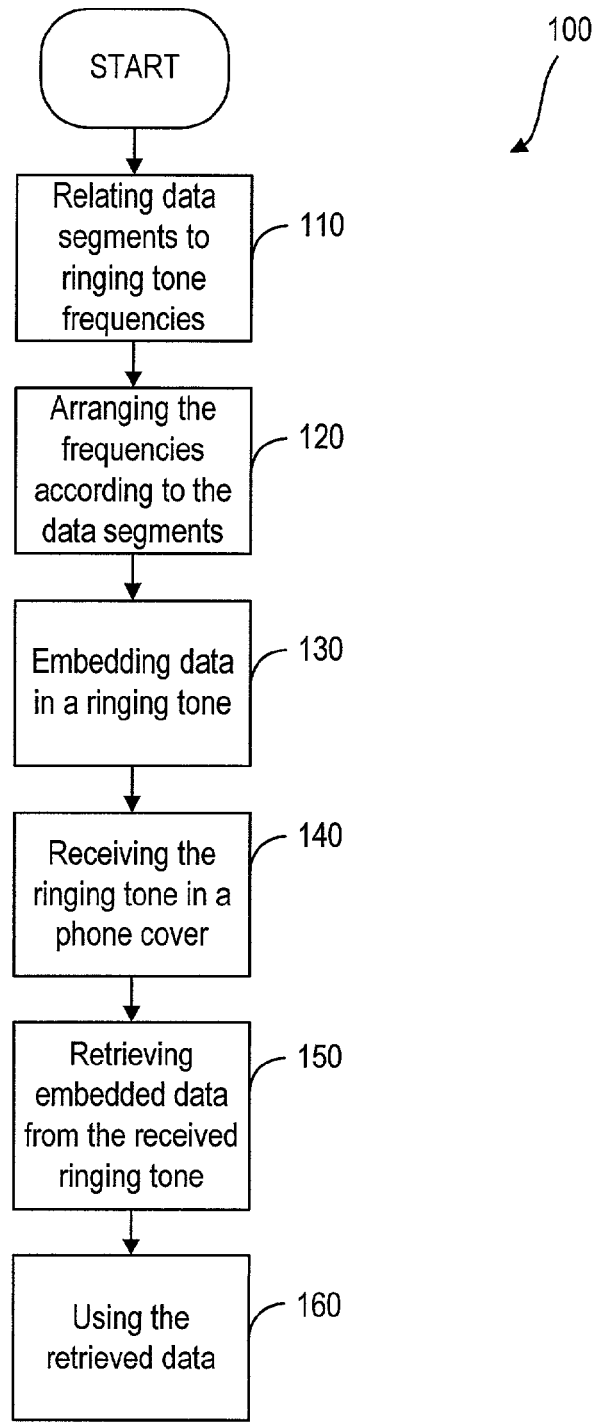
FIG. 2 is a flowchart illustrating the method of transferring data from the phone body to the phone cover, according to the present invention.

The method of transferring data from the phone body 10 to the phone cover 30, according to the present invention, is illustrated in the flowchart 100, as shown in FIG. 2. As shown in FIG. 2, the data to be transferred is divided into a sequence of data segments each having a bit pattern. At step 110, the data segments are related to different frequencies in the ringing tone. At step 120, a sequence of ringing tone frequencies is arranged according to the sequence of data segments. The data is then embedded in a ringing tone signal at step 130 in the phone body 10. As described in conjunction with FIG. 1, the data comprises a sequence of data segments and the ringing tone signal comprises a sequence of frequencies. The frequencies are related to a plurality of bit patterns by a protocol. As the ringing tone signal is received by the phone cover at step 140, the data segments of embedded data are retrieved by the phone cover at step 140 based on the frequencies in the received ringing tone signal. Consequently, the retrieved data is used to effect the functionality or to change the functionality of the phone cover 30 at step 160.

It should be noted that, the present invention has been described in conjunction with a mobile phone wherein a ringing tone is used for transferring data between the phone body and the phone cover. However, the present invention is applicable to any electronic device having a device body and a device accessory or attachment, wherein a ringing tone can be used for transferring data between the device body and the device accessory. For example, the electronic device can be a personal data assistant (PDA) device, or a Communicator device wherein a ringing tone can be used to send a message to the user and the ringing tone can also be used for transferring data between the device cover and the device accessory or attachment.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of transferring data in a device comprising a device body and a device accessory having a functionality, wherein the data comprises a sequence of data segments, said method comprising the steps of:
   conveying a ringing tone signal from the device body to the device accessory, wherein the ringing tone signal comprises a sequence of frequencies indicative of the sequence of data segments,
   receiving the ringing tone signal by the device accessory,
   retrieving in the device accessory the sequence of data segments from the received ringing tone signal based on the sequence of frequencies in the received ringing tone signal, and
   using the retrieved sequence of data segments for effecting the functionality, wherein the functionality is effected in a pattern based on the retrieved sequence of data segments.

2. The method of claim 1, further comprising the step of relating different frequencies or frequency ranges to different data segments prior to the conveying step.

3. The method of claim 2, further comprising the step of arranging the related frequencies according to the sequence of the data segments for providing at least one part of the ringing tone, prior to the conveying step.

4. The method of claim 2, wherein each data segment comprises two or more bits to form a bit pattern.

5. The method of claim 4, wherein at least one of the frequency ranges is related to a repeating signal for indicating the repetition of a bit pattern.

6. The method of claim 1, wherein the functionality can be changed by a programming data having a further sequence of data segments and the sequence of frequencies is further indicative of the further sequence of data segments.

7. The method of claim 1, wherein the device accessory comprises a device cover.

8. A system for transferring data in a device having a device body and a device accessory, wherein the device body is capable of providing a ringing tone signal comprising a sequence of frequencies, and the device accessory has a functionality and an effecting mechanism to effect the functionality, and wherein the data comprises a sequence of data segments, the system comprising:
   a first mechanism, disposed in the device accessory, for receiving the sequence of frequencies indicative of the sequence of data segments; and
   a second mechanism, disposed in the device accessory, adapted to retrieve the sequence of data segments from the received sequence of frequencies in the ringing tone signal, for allowing the effecting mechanism to effect the functionality of the device accessory in a pattern based on the retrieved sequence of data segments.

9. The system of claim 8, wherein the device is a mobile phone, the device body is a phone body and the device accessory comprises a phone cover.

10. The system of claim 8, wherein the functionality can be changed by a programming data having a further sequence of data segments and the sequence of frequencies is further indicative of the further sequence of data segments, and wherein the second mechanism is capable of retrieving the further sequence of data segments from the sequence of frequencies for allowing the effecting mechanism to change the functionality based on the programming data.

11. A mobile terminal having a phone body and a phone accessory, wherein the phone body is capable of receiving an external signal from an external device, and providing a ringing tone signal having a sequence of frequencies in response to the external signal, and wherein the phone accessory has a functionality, which can be effected by a data having a sequence of data segments provided by the phone body, the mobile terminal comprises:
   a first device, disposed in the phone body, for conveying the ringing tone signal to the phone accessory, wherein the sequence of frequencies indicative of the sequence of data segments; and
   a second device, disposed in the phone accessory, for receiving the ringing tone and retrieving the data sequence from the received ringing tone based on the sequence of frequencies in the received ringing tone so as to allow the phone accessory to effect the functionality in a manner based on the retrieved data segments.

12. The mobile terminal of claim 11, wherein the external signal is a call signal.

13. The mobile terminal of claim 11, wherein the functionality of the phone accessory can be changed by a programming data having a further sequence of data segments and the sequence of frequencies is further indicative of the further sequence of data segments.

14. The mobile terminal of claim 13, wherein the external signal is a short messaging service signal.

15. The mobile terminal of claim 13, wherein the external signal is a multimedia messaging service signal.

16. The mobile terminal of claim 11, wherein the phone accessory comprises a phone cover having the functionality.

* * * * *